(12) United States Patent
Miyata et al.

(10) Patent No.: US 6,895,141 B2
(45) Date of Patent: May 17, 2005

(54) CONTROL METHOD AND DEVICE FOR OPTICAL FILTER, AND OPTICAL NODE DEVICE

(75) Inventors: Hideyuki Miyata, Kawasaki (JP); Yutaka Kai, Kawasaki (JP); Isao Tsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 10/265,794

(22) Filed: Oct. 8, 2002

(65) Prior Publication Data

US 2003/0123789 A1 Jul. 3, 2003

(30) Foreign Application Priority Data

Dec. 28, 2002 (JP) ........................................ 2001-399219

(51) Int. Cl.⁷ ................................................ G02B 6/28
(52) U.S. Cl. ............................ 385/24; 385/15; 385/31; 385/39; 398/79; 398/82; 398/93; 398/94; 398/95
(58) Field of Search ............................. 385/15, 24, 31, 385/39; 398/79, 82, 93–95

(56) References Cited

U.S. PATENT DOCUMENTS

| | | | |
|---|---|---|---|
| 5,218,653 A | | 6/1993 | Johnson et al. ................ 385/11 |
| 5,504,608 A | * | 4/1996 | Neeves et al. ................. 398/79 |
| 5,646,774 A | * | 7/1997 | Takara et al. ................. 359/340 |
| 5,652,809 A | | 7/1997 | Aronson ......................... 385/7 |
| 5,717,510 A | * | 2/1998 | Ishikawa et al. ............. 398/199 |
| 5,850,492 A | | 12/1998 | Morasca et al. ............... 385/11 |
| 5,870,217 A | * | 2/1999 | Itou et al. ...................... 398/97 |
| 6,031,644 A | * | 2/2000 | Utsumi ......................... 398/27 |
| 6,043,922 A | * | 3/2000 | Koga et al. ................... 398/213 |
| 6,067,187 A | * | 5/2000 | Onaka et al. ............. 359/337.11 |
| 6,108,123 A | * | 8/2000 | Kinoshita .................... 359/337 |
| 6,144,485 A | * | 11/2000 | Sugaya et al. .............. 359/337 |
| 6,282,340 B1 | * | 8/2001 | Nasu et al. ..................... 385/37 |
| 6,288,836 B1 | * | 9/2001 | Kawasaki et al. ..... 359/341.42 |
| 6,441,933 B1 | * | 8/2002 | Jang ............................. 398/79 |
| 6,597,480 B1 | * | 7/2003 | Iida et al. ...................... 398/79 |
| 6,636,681 B2 | * | 10/2003 | Ji et al. ........................ 385/140 |
| 6,707,963 B2 | * | 3/2004 | Kawarai ....................... 385/24 |

FOREIGN PATENT DOCUMENTS

| | | | | |
|---|---|---|---|---|
| JP | 08-114776 | 5/1996 | ........... | G02F/1/125 |
| JP | 08-211349 | 8/1996 | ........... | G02F/1/11 |
| JP | 08-286160 | 11/1996 | ........... | G02F/1/11 |
| JP | 09-090303 | 4/1997 | ........... | G02F/1/125 |
| JP | 11-064809 | 3/1999 | ........... | G02F/1/125 |

* cited by examiner

*Primary Examiner*—Akm Enayet Ullah
*Assistant Examiner*—Daniel Petkovsek
(74) *Attorney, Agent, or Firm*—Staas & Halsey LLP (57) ABSTRACT

In the control method for the optical filter according to the present invention, WDM signal light obtained by wavelength division multiplexing a plurality of optical signals having different wavelengths is supplied to an optical filter to obtain output WDM signal light including a part of the plurality of optical signals. The output WDM signal light is converted into an electrical signal per wavelength channel of the output WDM signal light. Then, the optical filter is controlled according to the electrical signal so that the characteristic of the optical filter becomes stable.

21 Claims, 9 Drawing Sheets

CONTROL METHOD AND DEVICE FOR OPTICAL FILTER, AND OPTICAL NODE DEVICE

FIELD OF THE INVENTION

The present invention relates to a control method and device for an optical filter, and an optical node device.

DESCRIPTION OF THE RELATED ART

With an explosive increase in demand for data communication centered on the Internet traffic, high-capacity transmission and ultra long-haul transmission are desired in a backbone network. Further, since a variety of different services are offered to users, a highly reliable, flexible, and economical network is desired.

In recent years, the high-capacity transmission and the ultra long-haul transmission are rapidly proceeding owing to the wavelength division multiplexing (WDM) transmission technique and the optical amplifying technique, thereby allowing a reduction in transmission line cost. However, in the case of increasing the information processing capacity at network nodes in response to high-speed transmission and high-capacity transmission of signals, an increase in node cost and scale is unavoidable by a conventional method using opto/electric conversion and electrical switches. Under such circumstances, the development of an optical add/drop multiplexer (OADM) and an optical cross-connect (OXC) is being desired, so as to realize an economical and compact node in such a manner that optical circuits are substituted for large-scale electronic circuits to perform a variety of processing on the basis of an optical path in the optical domain.

The OADM and the OXC employ many optical functional devices such as an optical switch having a function of switching on/off light, attenuating light, or switching between one input and n outputs, and an optical wavelength filter for distributing signal light according to wavelength. Of these optical functional devices, a device for simultaneously processing optical signals having a plurality of desired wavelengths included in wavelength division multiplexed signal light is one of the important key devices for realization of the OADM. This simultaneous processing may be performed by using an AOTF (acousto-optic tunable filter), for example, thereby allowing simultaneous blocking or simultaneous extraction (dropping) of multiple wavelengths.

Figure 1:
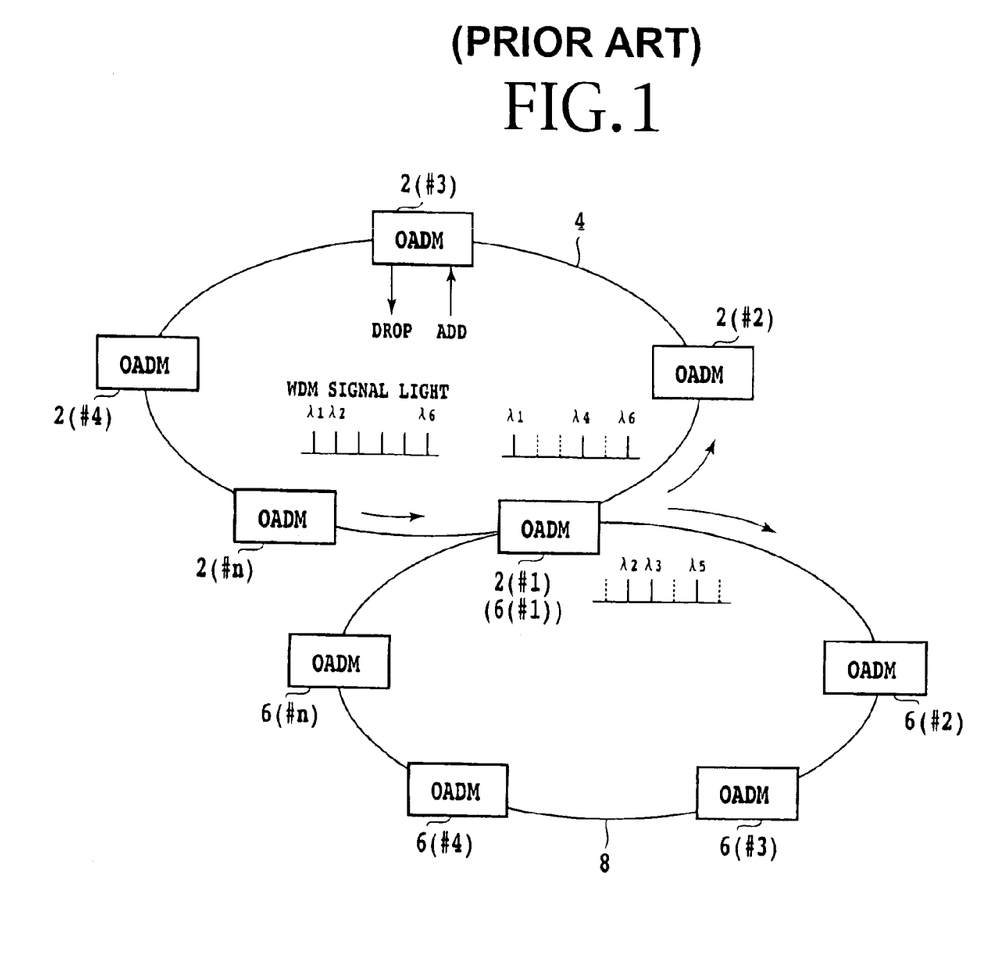
FIG. 1 is a block diagram showing an example of the network configuration of OADM nodes.

Referring to FIG. 1, there is shown an example of the network configuration of OADM nodes. Nodes 2(#1) to 2(#n) each provided by an OADM are connected by an optical fiber transmission line 4 to configure a ring network. Similarly, nodes 6(#1) to 6(#n) each provided by an OADM are connected by an optical fiber transmission line 8 to configure another ring network. In this case, the node 2(#l) and the node 6(#l) are common.

It is assumed that WDM signal light obtained by wavelength division multiplexing six channels of optical signals having different wavelengths $\lambda_1$ to $\lambda_6$ is transmitted from the node 2(#n) toward the node 2(#1). In this case, an example of the operation of the node 2(#1) is such that the node 2(#1) transmits the optical signals of the wavelengths $\lambda_1$, $\lambda_4$ and $\lambda_6$ to the node 2(#2) and transmits the optical signals of the remaining wavelengths $\lambda_2$, $\lambda_3$, and $\lambda_5$ to the node 6(#2).

Figure 2:
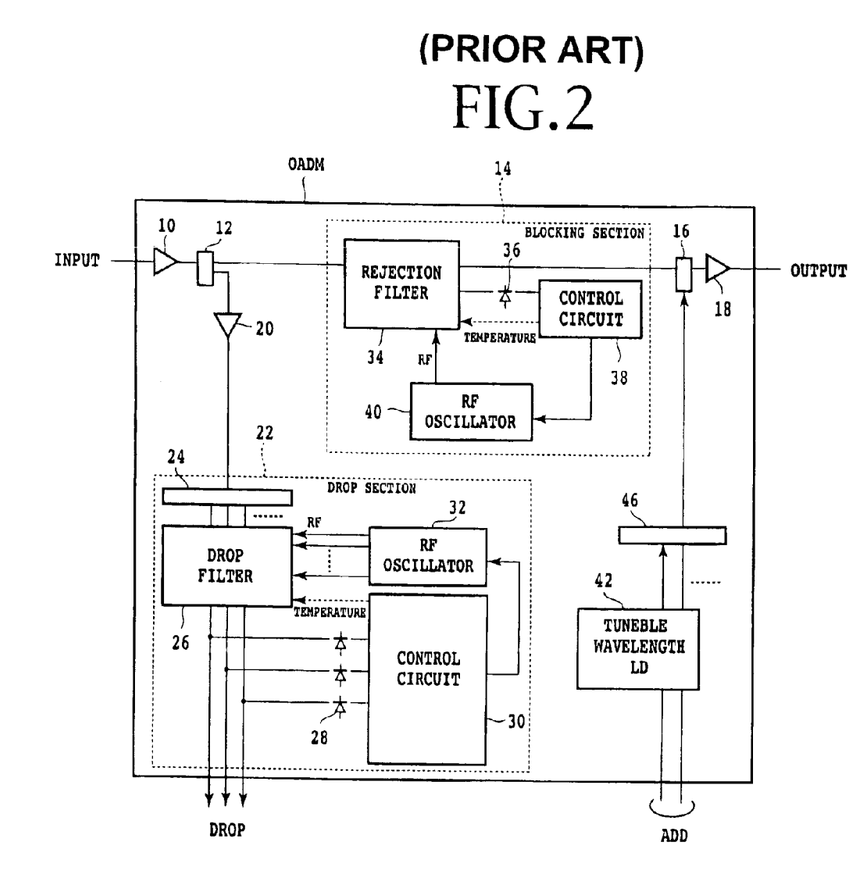
FIG. 2 is a block diagram showing an example of the configuration of an OADM usable as each node shown in FIG. 1.

Referring to FIG. 2, there is shown an example of the configuration of an OADM usable as each node shown in FIG. 1. This OADM has an optical amplifier 10, optical coupler 12, blocking section 14, optical coupler 14, and optical amplifier 18 arranged in this order from the input port toward the output port of the OADM.

WDM signal light input to the input port of the OADM is first amplified by the optical amplifier 10, and next branched into two WDM signal light components by the optical coupler 12. One of the two WDM signal light components is supplied to the blocking section 14, and the other is amplified by an optical amplifier 20 and next supplied to a drop section 22.

The WDM signal light supplied to the drop section 22 is supplied through an optical coupler 24 to a drop filter 26, thereby separating the WDM signal light into a plurality of optical signals to be dropped. Each optical signal is converted into an electrical signal by a photodetector 28. A control circuit 30 and an RF oscillator 32 control the drop filter 26 according to the electrical signal output from the photodetector 28.

On the other hand, the WDM signal light supplied to the blocking section 14 is separated into WDM signal light to be passed through the OADM and the remaining WDM signal light to be blocked, by a rejection filter 34. The WDM signal light to be blocked is converted into an electrical signal by a photodetector 36. A control circuit 38 and an RF oscillator 40 controls the rejection filter 34 according to the electrical signal output from the photodetector 36. The WDM signal light to be passed is supplied through the optical coupler 16 to the optical amplifier 18, and the resultant amplified WDM signal light is output from the output port of the OADM. An optical signal to be added to this OADM is supplied through a tunable wavelength LD 42 to an optical coupler 46 or supplied directly to the optical coupler 46. The tunable wavelength LD 42 performs wavelength conversion of the optical signal to be added. The optical signal from the optical coupler 46 is passed through the optical coupler 16, thereby being added to the WDM signal light to be passed.

As apparent from FIG. 2, this OADM has two main functions of selectively dropping and blocking at least one optical signal of a desired single wavelength or plural wavelengths. The case of simultaneously dropping optical signals of plural wavelengths is a function required in the node at the overlap of two or more ring networks or networks as in the case that a plurality of wavelengths are fed from one of the networks into another network. On the other hand, the case of simultaneously blocking optical signals of plural wavelengths is applied to a wavelength required for termination of passed light in the node and a wavelength possibly colliding with a wavelength to be added.

It is important for each node to allow add/drop at an arbitrary wavelength in flexibly operating a network. In this case, a device having a wavelength tuning function, such as an AOTF is useful for simultaneous processing to a plurality of arbitrary wavelengths.

In the case of selectively separating an optical signal having a desired wavelength by using a wavelength tuning function, it is necessary to make the transmission center wavelength in the filtering characteristic of the device completely coincide with the desired wavelength. Unless such complete coincidence is reached, there is a possibility of degradation in rejection level or erroneous blocking of multiple channels in the blocking process, whereas there is a possibility of increase in insertion loss or erroneous dropping of multiple channels in the dropping process. Such a problem is fatal as a node.

In general, the oscillation wavelength of an LD (laser diode) used as a transmitted light source has fluctuations, and the transmission center wavelength of a device itself having a wavelength characteristic of transmittance is also fluctuated by aged deterioration, environmental change, control error, etc. Therefore, it is essential to perform tracking control for detecting a wavelength shift error and performing feedback of this error, so as to obtain a stable operation.

In the case of blocking, signal light having wavelengths complementary to the wavelengths blocked is extracted as monitor light, and feedback control is performed so that the power of this monitor light becomes maximum. In the case of dropping, drop light is branched to obtain monitor light, and feedback control is performed so that the power of this monitor light becomes maximum.

The tracking control is generally performed per wavelength, and only an error with respect to a wavelength to be controlled is read to control the transmission center wavelength. In the case of performing simultaneous blocking or simultaneous dropping, optical signals of plural wavelengths are also simultaneously output as monitor light, and it is therefore necessary to determine the correspondence between an error signal and a wavelength. Examples of the method for this determination include adding a pilot tone (or dithering) to a drive signal for a wavelength subjected to feedback, and adding dithering of frequencies different according to wavelengths.

Thus, the wavelength subjected to feedback can be determined also in the case of plural wavelengths to be controlled, by dithering or the like. However, when the number of wavelengths to be processed is increased to result in an increase in number of wavelengths output to monitor ports, the power of an optical signal having a wavelength other than the wavelengths to be controlled is increased to cause noise to a detection signal. For this reason, the prior art has a problem that the increase in number of wavelengths causes a difficulty of control of an optical filter and a light source.

The other reasons for the difficulty of control are that if the dynamic range is preliminarily widened in consideration of saturation of amplification in a photodetector and an electronic circuit, so as to avoid the saturation, the amplitude of the detection signal becomes relatively low to cause a degradation in S/N, and that fluctuations in other wavelengths near the dithering frequencies may degrade the detection accuracy.

It is therefore an object of the present invention to provide a method and device which can eliminate the problem that the control of an optical filter or a light source becomes difficult when the number of wavelengths in WDM signal light is increased.

Other objects of the present invention will become apparent from the following description.

SUMMARY OF THE INVENTION

In accordance with a first aspect of the present invention, there is provided a control method for an optical filter. This method comprises the steps of supplying to the optical filter WDM signal light obtained by wavelength division multiplexing a plurality of optical signals having different wavelengths to obtain output WDM signal light including a part of the plurality of optical signals; converting the output WDM signal light into an electrical signal per wavelength channel of the output WDM signal light; and controlling the optical filter according to the electrical signal so that the characteristic of the optical filter becomes stable.

In accordance with a second aspect of the present invention, there is provided a control device for an optical filter for inputting WDM signal light obtained by wavelength division multiplexing a plurality of optical signals having different wavelengths to obtain output WDM signal light including a part of the plurality of optical signals. This device comprises means for converting the output WDM signal light into an electrical signal per wavelength channel of the output WDM signal light; and means for controlling the optical filter according to the electrical signal so that the characteristic of the optical filter becomes stable.

In accordance with a third aspect of the present invention, there is provided an optical node device. This device comprises an optical filter for inputting WDM signal light obtained by wavelength division multiplexing a plurality of optical signals having different wavelengths to obtain output WDM signal light including a part of the plurality of optical signals; means for converting the output WDM signal light into an electrical signal per wavelength channel of the output WDM signal light; and means for controlling the optical filter according to the electrical signal so that the characteristic of the optical filter becomes stable.

In accordance with a fourth aspect of the present invention, there is provided a method comprising the steps of supplying to an optical filter WDM signal light obtained by wavelength division multiplexing a plurality of optical signals having different wavelengths, and outputting from the optical filter output WDM signal light including a part of the plurality of optical signals; converting the output WDM signal light into an electrical signal per wavelength channel of the output WDM signal light; and controlling each optical signal of the WDM signal light according to the electrical signal so that the wavelength of each optical signal becomes stable.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the drawings.

The reason for difficulty of the control in the prior art is due to multiwavelength optical powers appearing in the monitor light upon simultaneous processing. In the present invention, only a wavelength desired to be controlled is separated off in the optical domain, so as to eliminate the multiwavelength effect. For example, dithering is added to each wavelength to specify a desired wavelength, and the desired wavelength is separated on an electrical stage after photodetection, thereby allowing easy separation of the desired wavelength in the optical domain.

Figure 3:
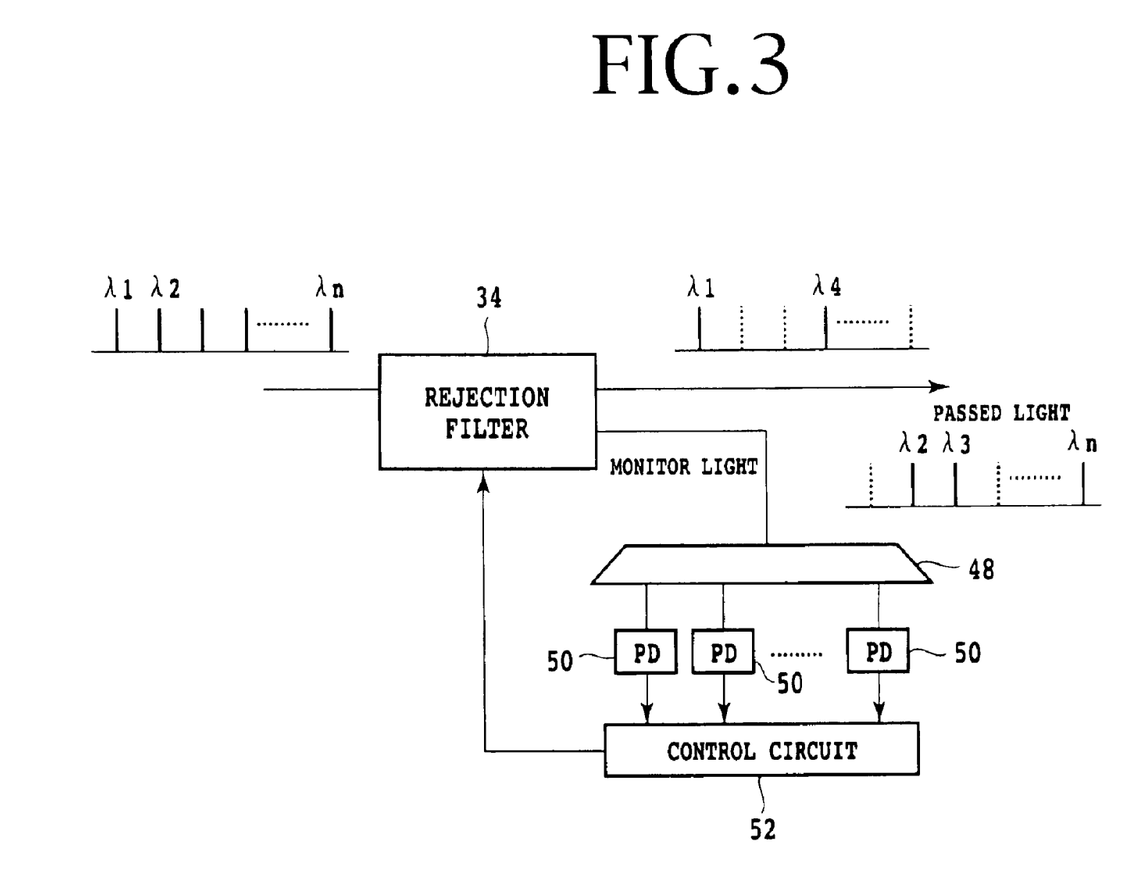
FIG. 3 is a block diagram showing a first preferred embodiment of the optical node device according to the present invention.

Referring to FIG. 3, there is shown a first preferred embodiment of the optical node device according to the present invention. This device includes a rejection filter 34 as an optical filter, an optical demultiplexer 48, a plurality of photodetectors (PD) 50, and a control circuit 52 for controlling the rejection filter 34.

WDM signal light obtained by wavelength division multiplexing a plurality of optical signals having different wavelengths $\lambda_1$ to $\lambda_n$ (n is an integer greater than 1) is supplied to the rejection filter 34. The rejection filter 34 effectively functions in its controlled condition to output passed light and monitor light. For example, the passed light includes the optical signals of the wavelengths $\lambda_1$ and $\lambda_4$, and the monitor light includes the optical signals of the wavelengths $\lambda_2, \lambda_3,$ and $\lambda_n$. Thus, the sum of the passed light and the monitor light from the rejection filter 34 is the WDM signal light supplied.

The monitor light output from the rejection filter 34 is separated into the optical signals of the individual wavelengths by the optical demultiplexer 48, and these optical signals are converted into electrical signals by the photodetectors 50, respectively. The electrical signals are next supplied to the control circuit 52. The control circuit 52 controls the rejection filter 34 so that the wavelength characteristic of transmittance of the rejection filter 34 becomes stable.

An AOTF may be used as the rejection filter 34, and an AWG (arrayed waveguide grating) or a dielectric multilayer filter may be used as the optical demultiplexer 48.

Known as a device suitable for an AOTF as an optical filter is a device having an optical waveguide and a waveguide structure for a surface acoustic wave (SAW) propagating in relation to the optical waveguide, in which both the optical waveguide and the waveguide structure are formed on a substrate. For example, the optical waveguide suitable for the AOTF may be obtained by thermal diffusion of Ti on a LiNbO3 substrate having birefringence of light. Further, an interdigital transducer (IDT) is also formed on the substrate, so as to propagate the surface acoustic wave in relation to the optical waveguide. The surface acoustic wave generated by the IDT is propagated along a predetermined path by a SAW guide, and is subsequently absorbed to be converted into heat by a saw absorber.

By propagating the surface acoustic wave in relation to the optical waveguide, light having a specific wavelength determined according to the power and frequency of the surface acoustic wave and the birefringence of the optical waveguide is subjected to mode conversion from the TE mode to the TM mode or vice versa (mode converter). Accordingly, by extracting the mode-converted light by any specific means such as a polarization beam splitter, WDM signal light can be separated into selected light and unselected light. The wavelength of the selected light depends on the frequency of the surface acoustic wave, so that the wavelength of the selected light is tunable according to the frequency of the surface acoustic wave.

Figure 4:
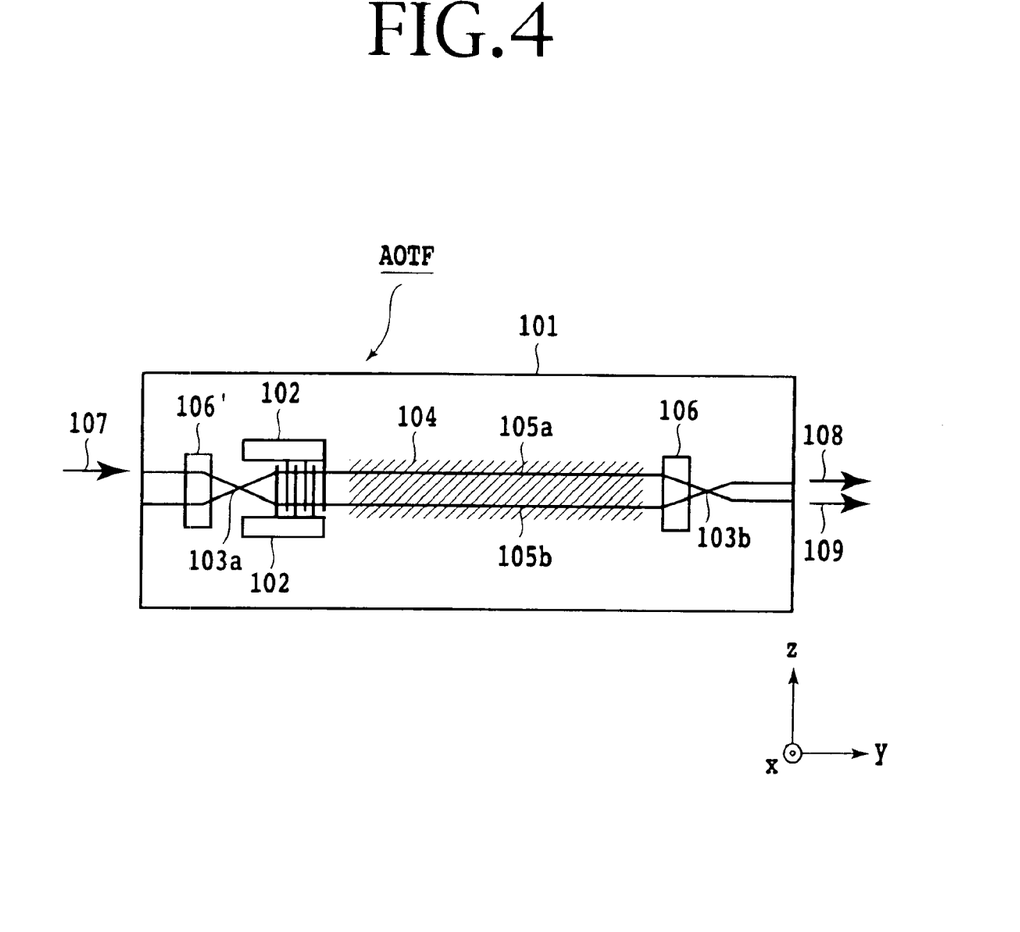
FIG. 4 is a plan view of an AOTF applicable to the present invention.

FIG. 4 is a plan view of an AOTF usable as the rejection filter 34 shown in FIG. 3. The AOTF includes a substrate 101 formed of lithium niobate (LiNbO$_3$), an IDT 102 for generating a surface acoustic wave, polarization beam splitters 103a and 103b each for separating light into orthogonal polarization components, a SAW guide 104 for propagating the surface acoustic wave generated by the IDT 102, optical waveguides 105a and 105b for propagating the polarization components separated by the polarization beam splitter 103a, and SAW absorbers 106 and 46' each for absorbing the surface acoustic wave. Reference numerals 107, 108, and 109 denote input light, unselected light, and selected light, respectively.

Light propagated in a fiber (not shown) as the input light 107 enters the AOTF from an end surface of the substrate 101 to reach the polarization beam splitter 103a. The input light 107 supplied is spatially split into a TE component and a TM component by the polarization beam splitter 103a.

The TM component propagates in the optical waveguide 105a to reach the polarization beam splitter 103b, and the TE component propagates in the optical waveguide 105b to reach the polarization beam splitter 103b. The polarization beam splitter 103b operates similarly to the polarization beam splitter 103a from a structural point of view, so that the TE component and the TM component are combined to be output as the unselected light 108.

When an RF signal is supplied to the IDT 102, a surface acoustic wave is generated on the substrate 101. The sound velocity of the surface acoustic wave is lower in the region of the SAW guide 104 than in the other region around the SAW guide 104, so that the surface acoustic wave generated is confined in the region of the SAW guide 104 during propagation.

At this time, the light propagating in the optical waveguides 105a and 105b undergoes polarization plane rotation at a specific wavelength determined by the frequency of the RF signal supplied to the IDT 102. By adjusting the power of the RF signal so that 90° polarization plane rotation occurs just upstream of the polarization beam splitter 103b, the TM light propagating in the optical waveguide 105a is converted into TE light, and the TE light propagating in the optical waveguide 105b is converted into TM light before reaching the polarization beam splitter 103b. Then, the TE light and the TM light having the specific wavelength thus converted are transmitted by the polarization beam splitter 103b, and therefore output as the selected light 109.

By adopting one of the unselected light 108 and the selected light 109 shown in FIG. 4 as the passed light shown in FIG. 3 and adopting the other as the monitor light shown in FIG. 3, the function of the rejection filter 34 is obtained. For example, in the case that the monitor light is the selected light 109, RF signals having frequencies (e.g., about 170 MHz) respectively uniquely corresponding to the wavelengths $\lambda_2, \lambda_3,$ and $\lambda_n$ are supplied from the control circuit 52 to the rejection filter 34. Each RF signal has a superimposed pilot tone or dithering, and synchronous detection or any other means is used to thereby stabilize the transmission center wavelength of the rejection filter 34 per channel.

According to this preferred embodiment, the optical demultiplexer 48 is used to separate the monitor light into a plurality of optical signals having different wavelengths, and the photodetectors 50 are used to convert the optical signals into electrical signals. Accordingly, even when the number of wavelengths to be processed is increased, there is no possibility that the powers of optical signals having wavelengths other than the wavelengths desired to be controlled may be applied to the photodetectors 50, thereby suppressing the generation of noise to the detection signals. Furthermore, it is not necessary to enlarge the dynamic range in consideration of the amplification saturation in the photodetectors 50 and their peripheral electronic circuits, so that the amplitude of the detection signals becomes relatively large to improve the S/N. Additionally, there is no possibility that the fluctuations of the other wavelengths near the dithering frequencies may degrade the detection accuracy.

Figure 5:
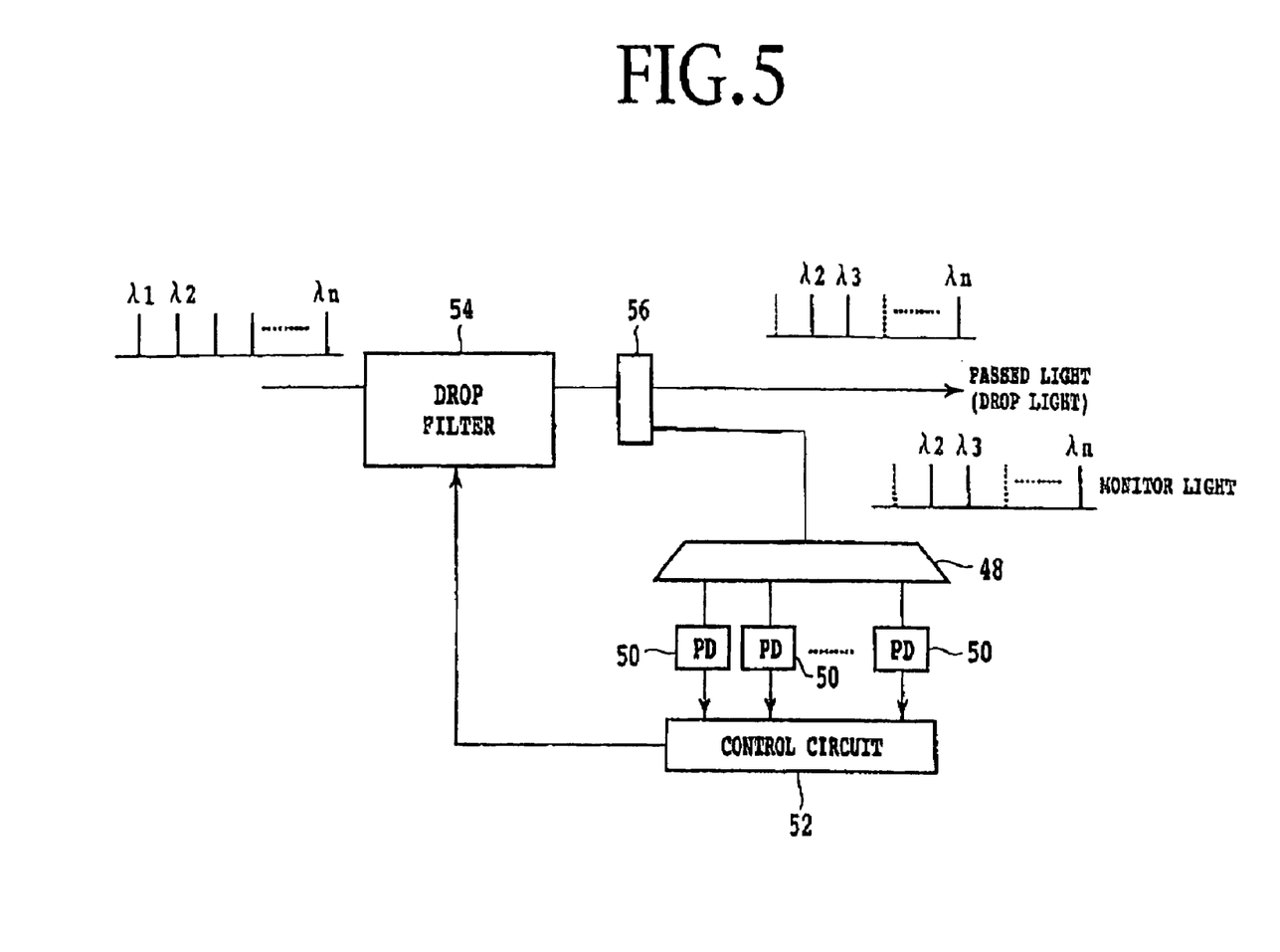
FIG. 5 is a block diagram showing a second preferred embodiment of the optical node device according to the present invention.

FIG. 5 is a block diagram showing a second preferred embodiment of the optical node device according to the present invention. In this preferred embodiment, a drop filter 54 as an optical filter is used in place of the rejection filter 34 shown in FIG. 3. As in the first preferred embodiment shown in FIG. 3, WDM signal light including optical signals of wavelengths $\lambda_1$ to $\lambda_n$ is supplied to the drop filter 54, and output WDM signal light including the optical signals of the wavelengths $\lambda_2$. $\lambda_3$, and $\lambda_n$, for example, is output from the drop filter 54.

Thus, the drop filter 54 has one output, and an optical coupler 56 is therefore provided to obtain the monitor light used for the control. The output WDM signal light from the drop filter 54 is separated into the passed light (drop light) and the monitor light by the optical coupler 56, and the passed light becomes output light from this device.

As in the preferred embodiment shown in FIG. 3, the monitor light is separated into the optical signals of the individual wavelengths by the optical demultiplexer 48, and these optical signals are supplied to the respective photodetectors 50. The control circuit 52 then controls the drop filter 54 according to the electrical signals output from the photodetectors 50. This control and its resultant technical effects are similar to those of the preferred embodiment shown in FIG. 3, so the description thereof will be omitted herein.

Figure 6:
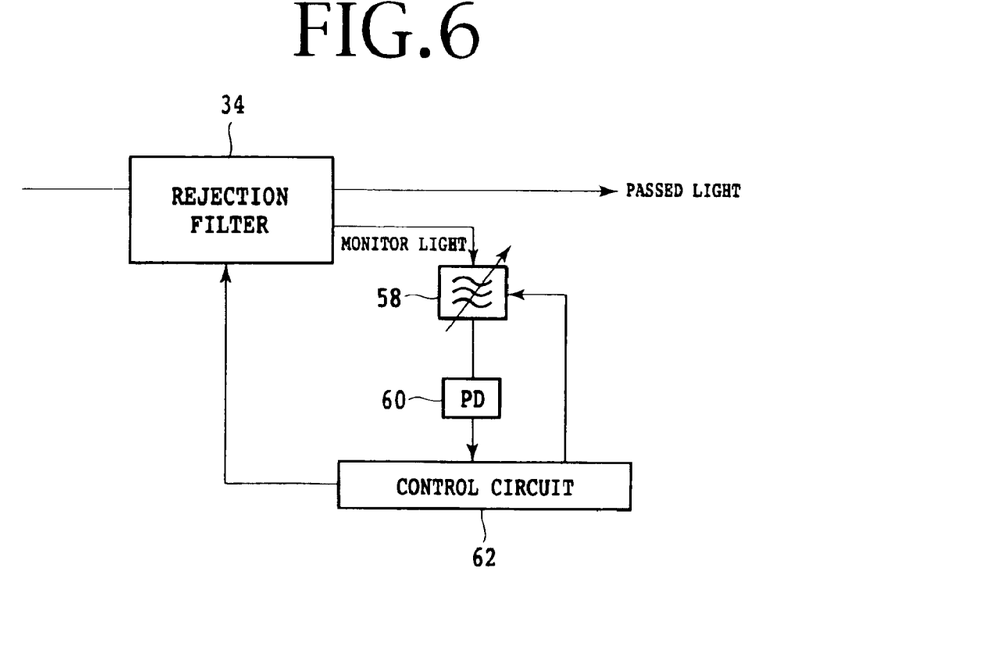
FIG. 6 is a block diagram showing a third preferred embodiment of the optical node device according to the present invention.

FIG. 6 is a block diagram showing a third preferred embodiment of the optical node device according to the present invention. In this preferred embodiment, a rejection filter 34 is used as in the preferred embodiment shown in FIG. 3, and a tunable wavelength filter 58, a photodetector 60, and a control circuit 62 are used respectively in place of the optical demultiplexer 48, the photodetectors 50, and the control circuit 52 shown in FIG. 3, so as to control the rejection filter 34 so that the characteristic of the rejection filter 34 becomes stable. For example, a dielectric multilayer filter or an AOTF may be used as the tunable wavelength filter 58.

The monitor light output from the rejection filter 34 is supplied to the tunable wavelength filter 58. The tunable wavelength filter 58 is a bandpass filter, for example, and the center wavelength of the passband of the bandpass filter is controlled by the control circuit 62.

An optical signal of one channel passed through the tunable wavelength filter 58 is converted into an electrical signal by the photodetector 60, and the control circuit 62 controls the rejection filter 34 according to this electrical signal.

According to this preferred embodiment, the center wavelength of the passband of the tunable wavelength filter 58 can be sequentially tuned to coincide with the wavelength of each optical signal of the WDM signal light by a control signal output from the control circuit 62, so that only one photodetector 60 is required for the conversion of optical signals of all the channels into electrical signals. Accordingly, by performing such time division control, the number of components can be greatly reduced over the preferred embodiment shown in FIG. 3.

Figure 7:
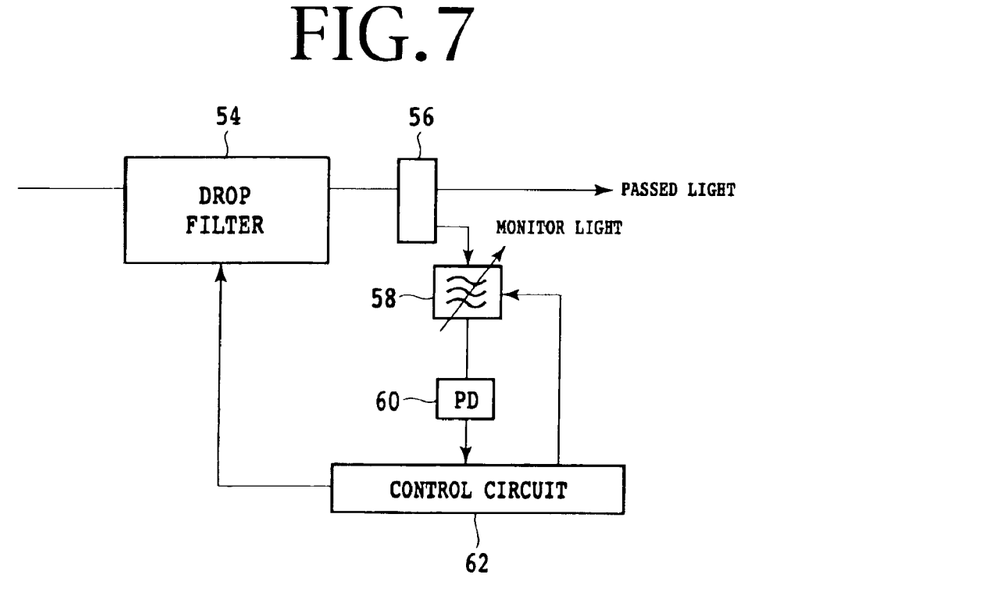
FIG. 7 is a block diagram showing a fourth preferred embodiment of the optical node device according to the present invention.

FIG. 7 is a block diagram showing a fourth preferred embodiment of the optical node device according to the present invention. In this preferred embodiment, a drop filter 54 is used as an optical filter in place of the rejection filter 34 shown in FIG. 6, and this change is accompanied by the connection of an optical coupler 56 to the output of the drop filter 54.

The operations of the drop filter 54 and the optical coupler 56 are similar to those in the preferred embodiment shown in FIG. 5, and the operations of the tunable wavelength filter 58, the photodetector 60, and the control circuit 62 for performing the control for stabilization of the wavelength characteristic of transmittance of the drop filter 54 will be understandable substantially in accordance with the preferred embodiment shown in FIG. 6.

Figure 8:
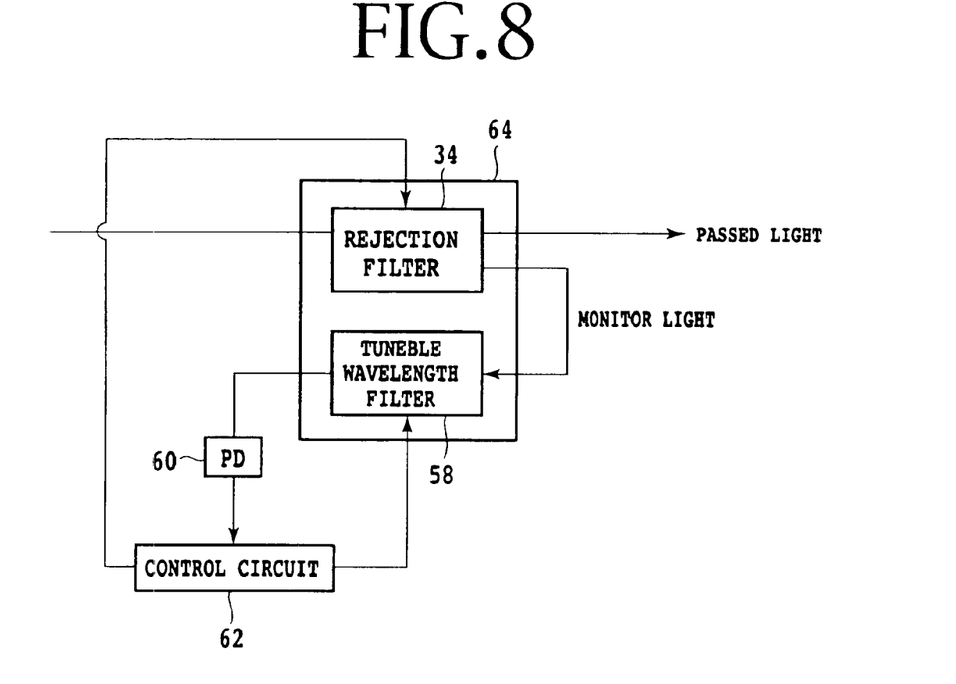
FIG. 8 is a block diagram showing a fifth preferred embodiment of the optical node device according to the present invention.

FIG. 8 is a block diagram showing a fifth preferred embodiment of the optical node device according to the present invention. This preferred embodiment is characterized in that the rejection filter 34 and the tunable wavelength filter 58 are integrated on a common substrate 64, in contrast to the preferred embodiment shown in FIG. 6. The waveguide structure for the monitor light propagating from the rejection filter 34 toward the tunable wavelength filter 58 may be provided by optical fiber wiring or by an optical waveguide formed on the substrate 64.

In the case of using an AOTF as each of the rejection filter 34 and the tunable wavelength filter 58, these components 34 and 58 can be easily formed on the substrate 64 by the same fabrication process. Accordingly, it is possible to provide an optical node device which can be easily manufactured and can be reduced in size according to this preferred embodiment.

Figure 9:
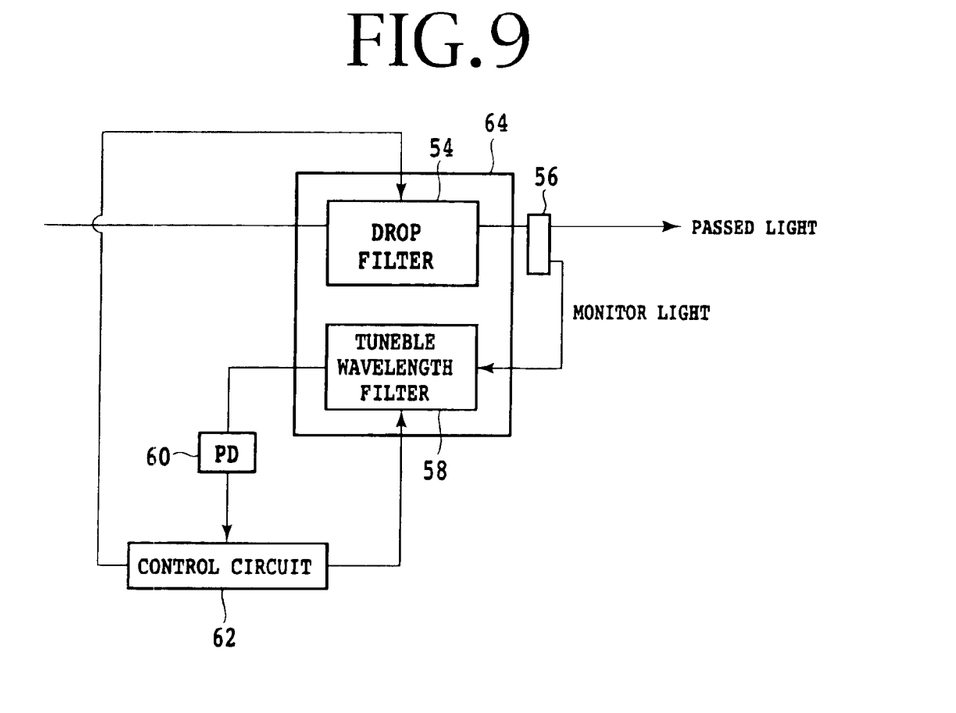
FIG. 9 is a block diagram showing a sixth preferred embodiment of the optical node device according to the present invention.

FIG. 9 is a block diagram showing a sixth preferred embodiment of the optical node device according to the present invention. This preferred embodiment is characterized in that the drop filter 54 and the tunable wavelength filter 58 are integrated on a common substrate 64, in contrast to the preferred embodiment shown in FIG. 7. The waveguide structure for the monitor light propagating from the drop filter 54 toward the tunable wavelength filter 58 may be provided by optical fiber wiring or by an optical waveguide formed on the substrate 64.

In the case of using an AOTF as each of the drop filter 54 and the tunable wavelength filter 58, these components 54 and 58 can be easily formed on the substrate 64 by the same fabrication process. Accordingly, it is possible to provide an optical node device which can be easily manufactured and can be reduced in size according to this preferred embodiment.

Figure 10:
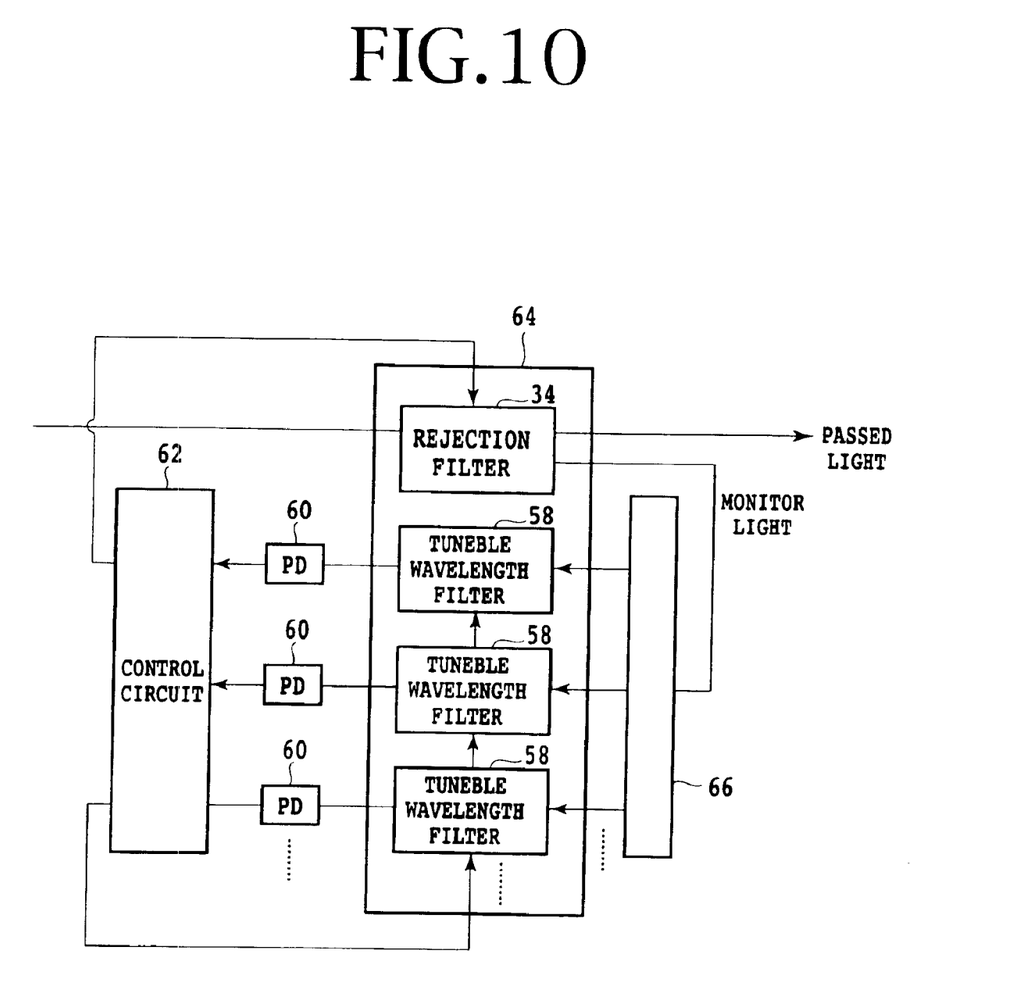
FIG. 10 is a block diagram showing a seventh preferred embodiment of the optical node device according to the present invention.

FIG. 10 is a block diagram showing a seventh preferred embodiment of the optical node device according to the present invention. This preferred embodiment is characterized in that a rejection filter 34 and a plurality of tunable wavelength filters 58 are integrated on the substrate 64 and that a plurality of photodetectors 60 are provided so as to respectively correspond to the plural tunable wavelength filters 58, in contrast to the preferred embodiment shown in FIG. 8.

In the case that the control circuit 62 performs time division control of the rejection filter 34 for each wavelength channel in the preferred embodiment shown in FIG. 8, there is a possibility that the result of control at the subject wavelength channel may be deviated from the target in waiting for the sequence of control.

To the contrary, according to the preferred embodiment shown in FIG. 10, the monitor light output from the rejection filter 34 is distributed into a plurality of powers by an optical coupler 66, and these powers are input into the tunable wavelength filters 58, respectively. Accordingly, by allocating a suitable band to each tunable wavelength filter 58, the waiting time for control in the time division control can be shortened to thereby solve the above problem.

Figure 11:
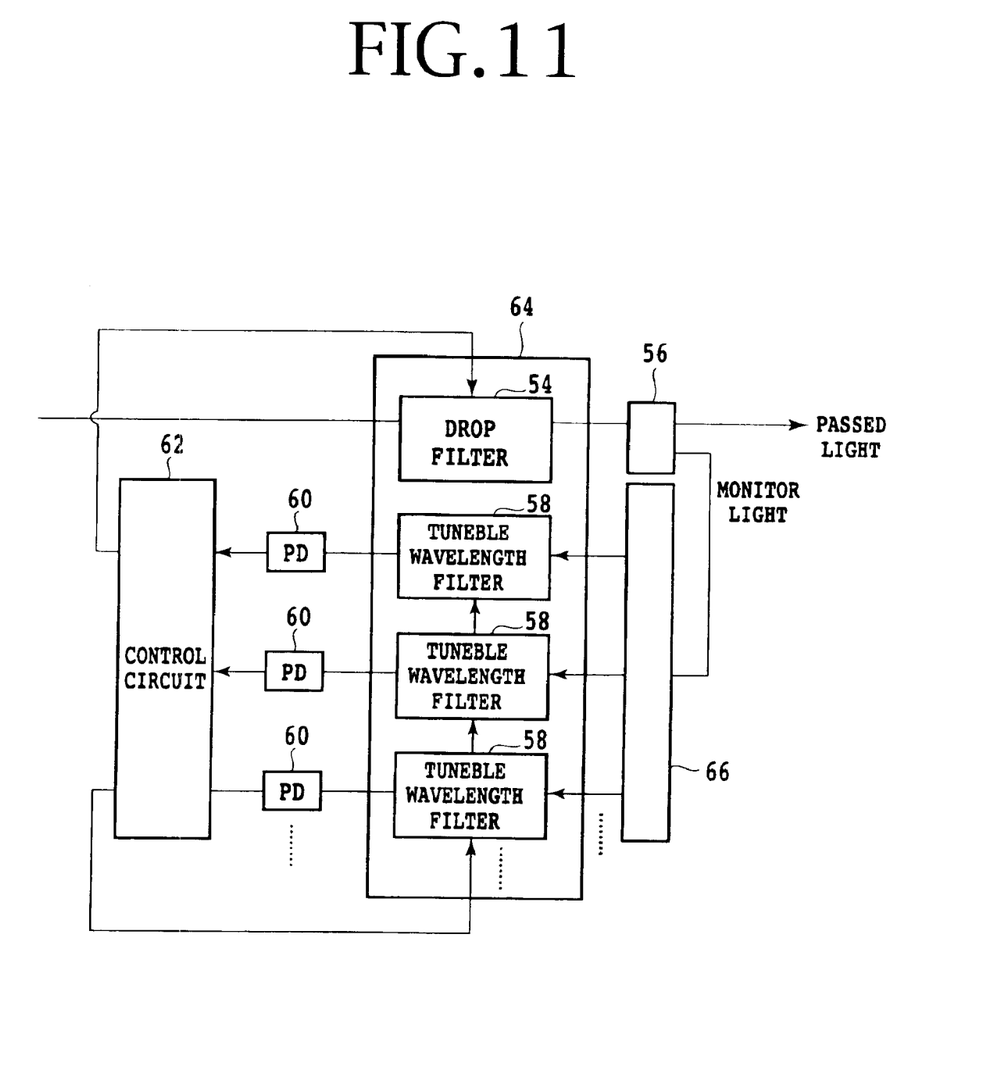
FIG. 11 is a block diagram showing an eighth preferred embodiment of the optical node device according to the present invention.

FIG. 11 is a block diagram showing an eighth preferred embodiment of the optical node device according to the present invention. This preferred embodiment is characterized in that a drop filter 54 and a plurality of tunable wavelength filters 58 are integrated on the substrate 64 and that a plurality of photodetectors 60 are provided so as to respectively correspond to the plural tunable wavelength filters 58, in contrast to the preferred embodiment shown in FIG. 9.

In the case that the control circuit 62 performs time division control of the drop filter 54 for each wavelength channel in the preferred embodiment shown in FIG. 9, there is a possibility that the result of control at the subject wavelength channel may be deviated from the target in waiting for the sequence of control.

To the contrary, according to the preferred embodiment shown in FIG. 11, the monitor light output from the drop filter 54 is distributed into a plurality of powers by an optical coupler 66, and these powers are input into the tunable wavelength filters 58, respectively. Accordingly, by allocating a suitable band to each tunable wavelength filter 58, the waiting time for control in the time division control can be shortened to thereby solve the above problem.

While the characteristic of an optical filter such as a rejection filter or a drop filter is feedback controlled according to the output from the optical filter in each preferred embodiment mentioned above, a light source for outputting each optical signal included in the WDM signal light may be feedback controlled according to the output from the optical filter, thereby controlling the wavelength of the subject optical signal.

According to the present invention as described above, it is possible to provide a method and device which can eliminate the problem that the control of an optical filter or a light source becomes difficult when the number of wavelengths in WDM signal light is increased.

The effects obtained by the specific preferred embodiments of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A control method for an optical filter, comprising:
supplying to said optical filter WDM signal light obtained by wavelength division multiplexing a plurality of optical signals having different wavelengths to obtain output WDM signal light including a part of said plurality of optical signals;
converting said output WDM signal light into an electrical signal per wavelength channel of said output WDM signal light; and
controlling said optical filter according to said electrical signal so that a characteristic of said optical filter becomes stables,
wherein said converting comprises:
supplying said output WDM signal light to a tunable wavelength filter, and
converting an optical signal extracted by said tunable wavelength filter into an electrical signal by using a photodetector.

2. A control method according to claim 1, wherein said converting comprises:
supplying said output WDM signal light to a plurality of tunable wavelength filters, and
converting a plurality of optical signals extracted by said plurality of tunable wavelength filters into electrical signals by using a plurality of photodetectors, respectively.

3. A control method according to claim 1, wherein said optical filter comprises a rejection filter, said rejection filter further outputting passed WDM signal light, wherein the sum of said passed WDM signal light and said output WDM signal light is said WDM signal light.

4. A control method according to claim 1, wherein said optical filter comprises a drop filter,
said control method further comprising extracting a part of light passed through said drop filter to obtain said output WDM signal light.

5. A control device for an optical filter for inputting WDM signal light obtained by wavelength division multiplexing a plurality of optical signals having different wavelengths to obtain output WDM signal light including a part of said plurality of optical signals, said control device comprising:
means for converting said output WDM signal light into an electrical signal per wavelength channel of said output WDM signal light; and
means for controlling said optical filter according to said electrical signal so that a characteristic of said optical filter becomes stable,
wherein said converting means comprises:
a tunable wavelength filter for inputting said output WDM signal light, and
a photodetector for converting an optical signal extracted by said tunable wavelength filter into an electrical signal.

6. A control device according to claim 5, wherein said converting means comprises a plurality of tunable wavelength filters for inputting said output WDM signal light, and a plurality of photodetectors for converting a plurality of optical signals extracted by said plurality of tunable wavelength filters into electrical signals, respectively.

7. A control device according to claim 5, wherein said optical filter comprises a rejection filter, and said rejection filter further outputting passed WDM signal light, wherein the sum of said passed WDM signal light and said output WDM signal light is said WDM signal light.

8. A control device according to claim 5, wherein said optical filter comprises a drop filter, and said control device further comprising an optical coupler for extracting a part of light passed through said drop filter to obtain said output WDM signal light.

9. An optical node device, comprising:

an optical filter for inputting WDM signal light obtained by wavelength division multiplexing a plurality of optical signals having different wavelengths to obtain output WDM signal light including a part of said plurality of optical signals;

means for converting said output WDM signal light into an electrical signal per wavelength channel of said output WDM signal light; and means for controlling said optical filter according to said electrical signal so that a characteristic of said optical filter becomes stable;

wherein said converting means comprises:
- a tunable wavelength filter for inputting said output WDM signal light, and
- a photodetector for converting an optical signal extracted by said tunable wavelength filter into an electrical signal.

10. An optical node device according to claim 9, wherein said converting means comprises a plurality of tunable wavelength filters for inputting said output WDM signal light, and a plurality of photodetectors for converting a plurality of optical signals extracted by said plurality of tunable wavelength filters into electrical signals, respectively.

11. An optical node device according to claim 9, wherein said optical filter comprises a rejection filter, said rejection filter further outputting passed WDM signal light, wherein the sum of said passed WDM signal light and said output WDM signal light is said WDM signal light.

12. An optical node device according to claim 9, wherein said optical filter comprises a drop filter, and said control device further comprising an optical coupler for extracting a part of light passed through said drop filter to obtain said output WDM signal light.

13. An apparatus comprising:

an optical filter receiving a wavelength division multiplexed (WDM) signal light including a plurality of optical signals at different wavelengths multiplexed together, and filtering the WDM signal light to thereby output a first light comprising some of the optical signals and a second light comprising different of the optical signals than those in the first light;

a tunable wavelength filter extracting one of the optical signals in the second light from the second light;

a photodetector converting the extracted optical signal into an electrical signal; and a controller controlling the optical filter in accordance with the electrical signal to stabilize a characteristic of the optical filter.

14. The apparatus according to claim 13, wherein the optical filter is a rejection filter.

15. The apparatus according to claim 13, wherein the optical filter is a drop filter.

16. An apparatus comprising:

an optical filter receiving a wavelength division multiplexed (WDM) signal light including a plurality of optical signals at different wavelengths multiplexed together, and filtering the WDM signal light to thereby output a first light comprising some of the optical signals and a second light comprising different of the optical signals than those in the first light;

a tunable wavelength filter extracting one of the optical signals in the second light from the second light;

a photodetector converting the extracted optical signal into an electrical signal; and means for controlling the optical filter in accordance with the electrical signal to stabilize a characteristic of the optical filter.

17. The apparatus according to claim 16, wherein the optical filter is a rejection filter.

18. The apparatus according to claim 17, wherein the optical filter is a drop filter.

19. An apparatus comprising:

an optical filter receiving a wavelength division multiplexed (WDM) signal light including a plurality of optical signals at different wavelengths multiplexed together, and filtering the WDM signal light to thereby output a first light comprising some of the optical signals and a second light comprising different of the optical signals than those in the first light;

a tunable wavelength filter extracting one of the optical signals in the second light from the second light; and a controller controlling the optical filter in accordance with the extracted optical signal to stabilize a characteristic of the optical filter.

20. The apparatus according to claim 19, wherein the optical filter is a rejection filter.

21. The apparatus according to claim 20, wherein the optical filter is a drop filter.

* * * * *

UNITED STATES PATENT AND TRADEMARK OFFICE
CERTIFICATE OF CORRECTION

PATENT NO. : 6,895,141 B2
DATED : May 17, 2005
INVENTOR(S) : Hideyuki Miyata et al.

It is certified that error appears in the above-identified patent and that said Letters Patent is hereby corrected as shown below:

Column 10,
Line 9, replace "stables," with -- stable, --.
Line 45, after "stable" replace "," with -- ; --.

Column 12,
Line 27, after "claim" replace "17" with -- 16 --.

Signed and Sealed this

Thirty-first Day of January, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,895,141 B2 | Page 1 of 1 |
| APPLICATION NO. | : 10/265794 | |
| DATED | : May 17, 2005 | |
| INVENTOR(S) | : Hideyuki Miyata et al. | |

It is certified that error appears in the above-identified patent and that said Letters Patent is hereby corrected as shown below:

On the Title Page, Column 1 (30) Foreign Application Priority Data, replace "Dec. 28, 2002" with --Dec. 28, 2001--, therefor.

Signed and Sealed this

Thirty-first Day of October, 2006

JON W. DUDAS
*Director of the United States Patent and Trademark Office*